United States Patent [19]
Gore

[11] 3,970,556
[45] July 20, 1976

[54] FLOATING SKIMMER FOR CLEANING THE SURFACE OF A BODY OF LIQUID, METHOD AND APPARATUS

[76] Inventor: Douglas John Gore, 5168 Brookside Lane, Concord, Calif. 94521

[22] Filed: Sept. 23, 1974

[21] Appl. No.: 508,446

[52] U.S. Cl. .............................. 210/83; 210/242 S
[51] Int. Cl.² .................. B01D 21/00; E02B 15/04
[58] Field of Search ...... 210/83, 242, 169, DIG. 21; 119/5

[56] References Cited
UNITED STATES PATENTS

| | | | |
|---|---|---|---|
| 318,689 | 5/1885 | Breese | 210/242 |
| 2,330,508 | 9/1943 | McColl | 210/242 |
| 3,534,859 | 10/1970 | Amero et al. | 210/DIG. 21 |
| 3,567,020 | 3/1971 | Whitaker | 210/169 |
| 3,688,909 | 9/1972 | Titus | 210/DIG. 21 |
| 3,700,109 | 10/1972 | Lasko | 210/242 |
| 3,708,070 | 1/1973 | Bell | 210/242 |
| 3,745,115 | 7/1973 | Olsen | 210/242 |
| 3,753,492 | 8/1973 | Aiello | 210/DIG. 21 |
| 3,782,553 | 1/1974 | Brekke | 210/DIG. 21 |

FOREIGN PATENTS OR APPLICATIONS

| | | | |
|---|---|---|---|
| 866,659 | 8/1958 | United Kingdom | 210/242 |

Primary Examiner—Theodore A. Granger
Attorney, Agent, or Firm—Owen, Wickersham & Erickson

[57] ABSTRACT

A floating skimmer, for cleaning the surface of the liquid around the skimmer, has an outer, annular shaped body with an inner cavity. Flotation and ballast chambers in the outer body regulate the level of flotation of the weir, and a peripheral opening admits a flow of liquid into the central cavity. The liquid is pumped out of the central cavity through a drain opening in the base plate. A movable weir extends across the width of the inlet opening and regulates the quantity and velocity of liquid which flows through the opening and into the central cavity. The outer edge of the weir is connected to the body by a hinge connection which permits the weir to articulate about that edge. A float is mounted beneath the weir so that the weir floats on the liquid within the central cavity and with the back inner edge of the weir elevated. This produces a cascade of liquid off the upper edge of the weir and a regulated skimming of the surface of the liquid by the cascade action. A method of skimming is also disclosed.

20 Claims, 8 Drawing Figures

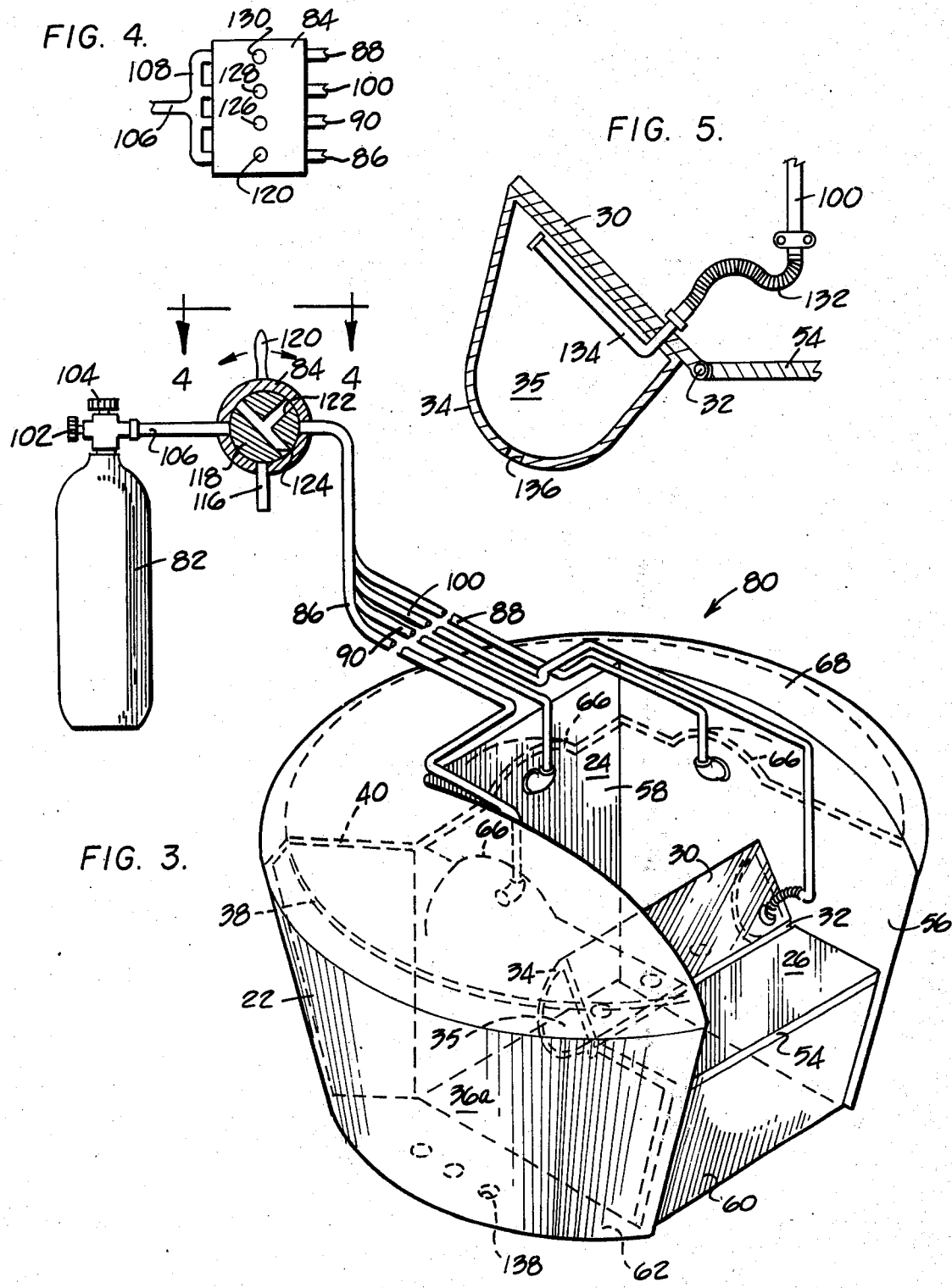

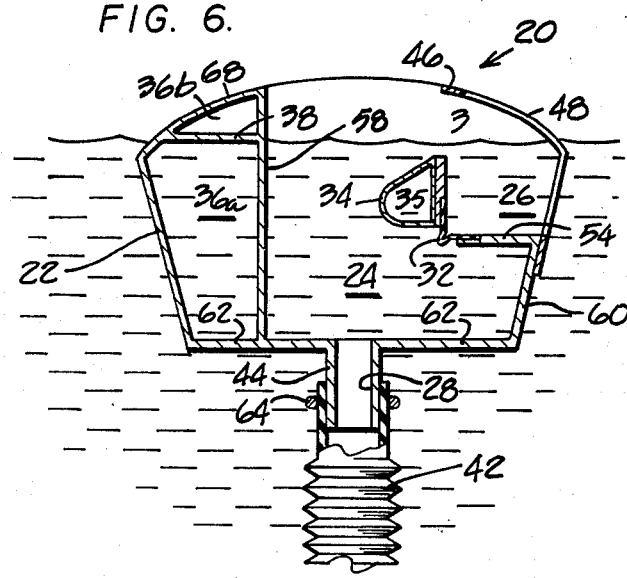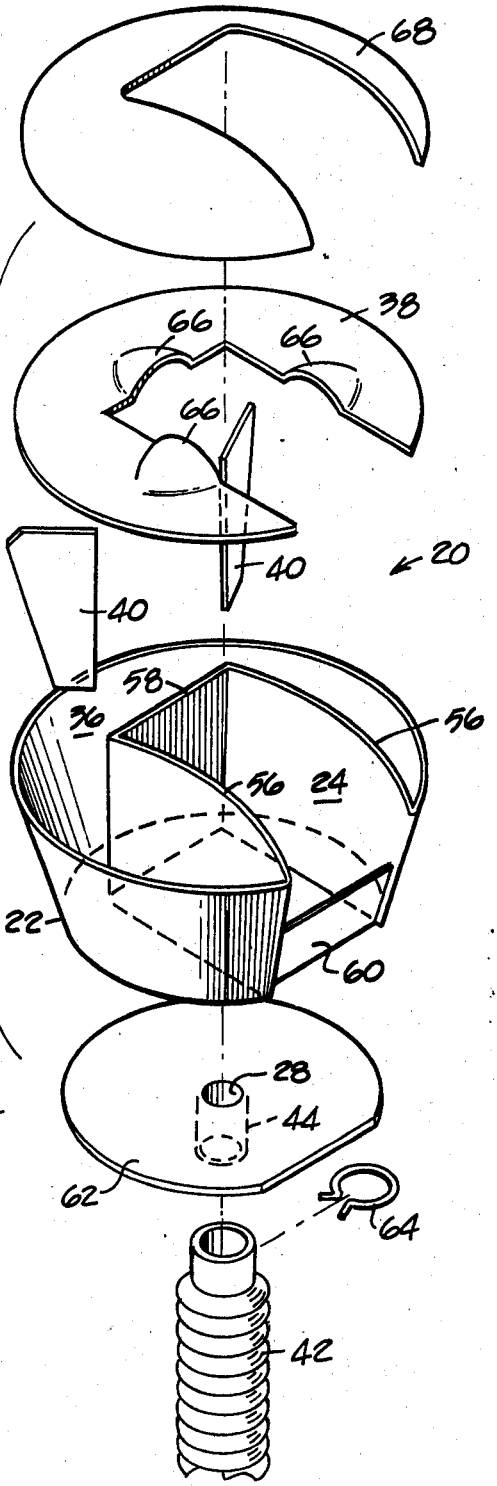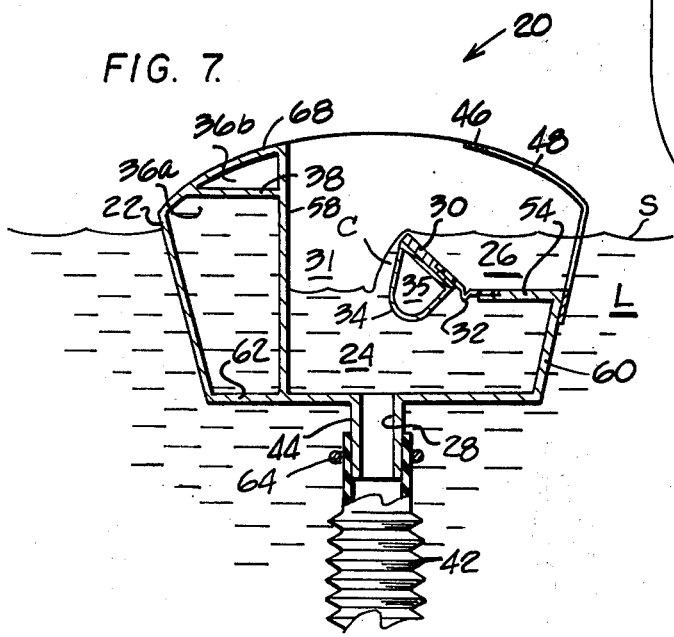

FLOATING SKIMMER FOR CLEANING THE SURFACE OF A BODY OF LIQUID, METHOD AND APPARATUS

BACKGROUND OF THE INVENTION

This invention relates to a method and apparatus for cleaning the surface of a body of liquid. It relates particularly to a floating skimmer and incorporates an articulated weir which rides on a float so as to provide a self compensating cascade action for skimming the surface of liquid surrounding the skimmer.

The majority of the dirt and debris that gets into a body of liquid is airborne. Liquids have a surface tension which tends to retain most of this airborne dirt and debris in a relatively tough film on the very upper surface. The removal of this contaminated film, or meniscus, provides an efficient and thorough method of cleaning polluted bodies of liquid. However, to be truly effective, the meniscus or film removing skimmer should be versatile enough to act under many different conditions. It should also be constructed to remove the meniscus and not any substantial quantities or layers of liquid underneath this tough upper film. Depending upon the particular installation, the skimmer should therefore be self-compensating for differences in viscosity and rate of effluent leaving the skimmer.

In addition to being self-compensating, there are many applications in which the skimmer should also be manually adjustable in the course of operation. This permits an operator to "tune" the device to maximize its effectiveness as a skimmer.

Some floating skimmers described in the prior art have proposed a floating annular weir which could create the desired skimming effect under ideal conditions. However, under conditions of agitation, such as when being rocked by waves, the lower edge of such prior art devices would tend to dig too deeply into the liquid. This results in loss of the meniscus-pulling effect. Also the upper edge of such prior art devices would tend to pull out of the water under such conditions, and this would result in loss of all the pulling effect.

SUMMARY OF THE PRESENT INVENTION

It is an important object of the present invention to construct a floating skimmer with a movable, self-compensating weir to maximize the removal of the upper film or meniscus. It is a related object of the present invention to construct a floating skimmer which is manually controllable while the skimmer is in operation so that the operator can change the characteristics in the course of operation.

In one embodiment of the present invention, the skimmer comprises an outer ring shaped body having an inner, central cavity. A flotation and ballast chamber is formed integrally in the outer body.

An inlet opening in one peripheral part of the outer body admits a flow of liquid into the central cavity. The liquid in the cavity is pumped through a drain opening in the base plate.

A movable weir extends across the width of the inlet opening. It is connected to the outer body along its outer edge by a hinge connection which permits articulation to regulate the quantity of and velocity liquid flowing through the opening and into the central cavity. A float on the bottom of the weir rides on the liquid within the central cavity and adjusts the level of the weir in relation to the height of the external liquid.

The incoming liquid flowing through the opening must therefore flow over the inclined weir, and it falls off the back, inner edge of the weir in a cascade action. By maintaining the weir at the proper height, the incoming water is accelerated, and the waterfall or cascade effectively pulls the upper film from off the liquid. Because of the acceleration produced by the inclined weir, the skimmer very quickly cleans the entire surface of the liquid around the skimmer.

The way in which the weir rides on the float also provides a self-compensating action which compensates for factors such as viscosity and amount of effluent leaving the drain.

The annular chamber in the main body is partly filled with liquid ballast, and the placement of the chamber provides a stabilizing effect. The liquid ballast also provides a uniform flotation which coacts with the effluent being pumped through the drain to further stabilize the attitude of the skimmer during operation.

During operation, when the liquids are being removed by way of the drain, an air chamber is formed behind the weir which causes the skimmer to rise in the water. This rising action is compensated for by the general nature of the liquid ballast in the annular compartment in the main body. The positioning of the weir and the liquid ballast causes the air pocket to form behind the general center of flotation, and consequently creates a positive buoyancy. This positive buoyancy created by the air pocket is compensated for by a mass of liquid in the annular flotation compartment of the main body, which lies to the rear of the skimmer.

The annular ballast compartment or jacket is preferably subdivided into three chambers — two side chambers and one back chamber. The flotation and ballast characteristics of these three chambers can be individually adjusted.

In one embodiment of the invention (an embodiment particularly adapted for operation in large bodies of water, such as oceans) the skimmer incorporates controls for regulating the buoyancy of both the skimmer and the floating weir. This embodiment of the present invention enables the skimmer, and particularly the weir float, to take on different characteristics of skimming depending upon the types of liquids being skimmed and the general conditions in which it is found. In such applications the skimmer operates to pull the pollutant layer, such as an oil spill, off the water surface. This pollutant layer, in such applications corresponds to the miniscus film of smaller bodies of water.

Floating skimmer apparatus and methods which incorporate the structures and techniques described above constitute other, specific objects of the present invention.

Other objects, advantages and features of the invention will become apparent from the following detailed description of one preferred embodiment taken with the accompanying drawings.

BRIEF DESCRIPTION OF THE DRAWINGS

FIG. 3 is an isometric view of a floating liquid skimmer constructed in accordance with another embodiment of the present invention. The skimmer shown in FIG. 3 is particularly adapted for operation in large bodies of open water, such as oceans, and incorporates controls for regulating the buoyancy of both the skimmer and the floating weir;

FIG. 4 is a top plan view of a control valve arrangement for the skimmer shown in FIG. 3 and is taken along the line and in the direction indicated by the arrows 4—4 in FIG. 3;

FIG. 5 is an enlarged end elevation view of the floating weir of the FIG. 3 skimmer;

FIG. 6 shows the skimmer in the position assumed in the body of water in the "at rest" or non-operating position of the skimmer;

FIG. 7 is a view like FIG. 6, but showing the skimmer in the operating position, with the self-compensating, floating weir positioned to cause the incoming water to cascade off the inner lip of the weir and to provide the skimming action for pulling the meniscus off the water drawn into the skimmer; and FIG. 8 is an exploded view showing the component parts of the body of the skimmer.

DESCRIPTION OF THE PREFERRED EMBODIMENTS

Figure 1:
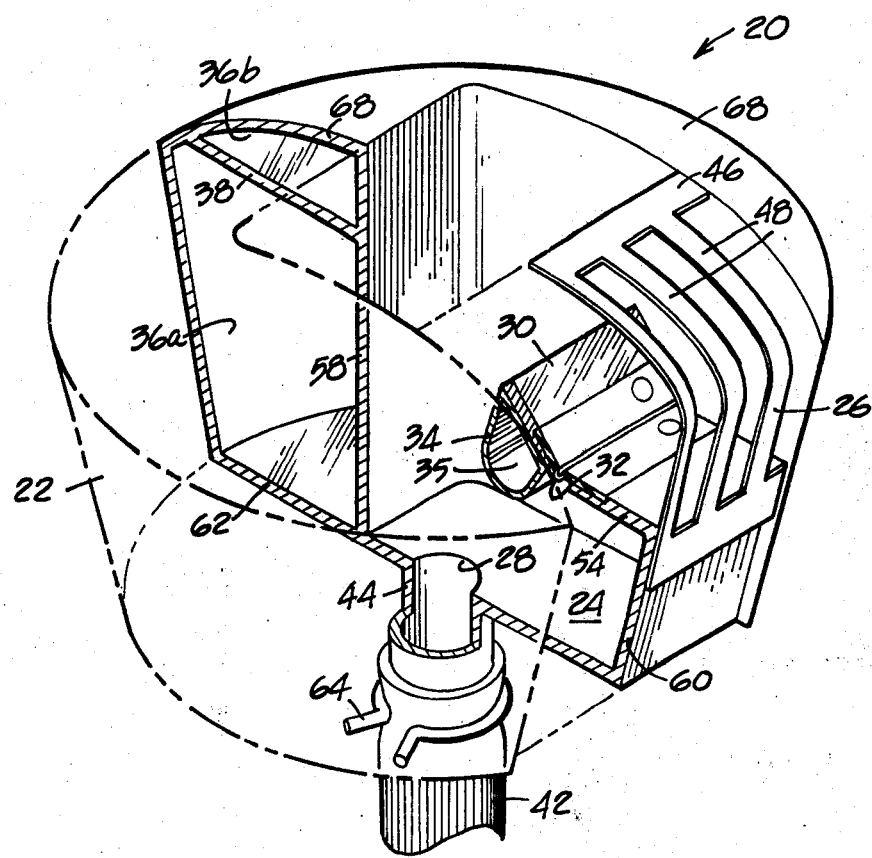
FIG. 1 is an isometric view, partly in section and partly in phantom outline, of a floating liquid skimmer constructed in accordance with one embodiment of the present invention.

A floating skimmer constructed in accordance with one embodiment of the present invention is indicated generally by the reference numeral 20 in FIGS. 1, 6, 7 and 8.

As best illustrated in FIG. 7, the floating skimmer 20 is constructed to skim the surface S of a body of liquid L which surrounds the floating skimmer.

The skimmer 20 comprises an outer body 22 having an inner, generally centrally-disposed cavity 24. The outer body has an opening 26 in one peripheral part for admitting a flow of the liquid into the central cavity.

A drain opening 28 is formed in the underside of the body for draining the liquid from the cavity 24 under the control of an associated pump (not shown).

A movable weir 30 extends across the width of the opening 26 for regulating the quantity and velocity of liquid which can flow through the opening and into the central cavity 24. The weir 30 is connected to the outer body along the outer edge of the weir by a hinge-type connection 32 which permits the weir to articulate and swing up and down about the generally horizontally-extending axis of the hinge 32.

A float 34 is disposed on the lower side of the weir 30, and this float 34 adjusts the height of the weir with respect to the body 22 to cause, in the operating condition of the skimmer, a waterfall or cascade C of liquid off the upper edge of the weir. This effectively skims the surface of the incoming liquid.

The outer body 22 also has a built-in flotation and ballast chamber 36 (see FIG. 8) which extends around the periphery of the outer body from one edge of the opening 26 to an opposite edge of the opening.

As illustrated in FIGS. 1, 6 and 7, this chamber 36 may be subdivided, by a generally horizontally-extending partition 38, into a lower ballast chamber 36a and an upper flotation chamber 36b.

This compartment 36 is preferably further subdivided by two generally vertically-extending divider plates 40 (see FIG. 8), into two side chambers and a back chamber. In the form of the invention illustrated in FIGS. 1, 6, 7 and 8, these divider plates 40 serve primarily to baffle and to prevent lateral movement of the ballast liquid within the annular-shaped compartment 36, and any imbalance and instability that might result from such uncontrolled movement of the ballast liquid. In the embodiment of the invention illustrated in FIGS. 3–5, the divider plates 40 also serve to permit regulation of the attitude of the outer body, side-to-side and front-to-back, by permitting independent control of the relationship of the ballast and the flotation air within the three separate subcompartments. This will be described in more detail below with specific reference to the FIG. 3 form of the present invention.

The embodiment of the invention illustrated in FIGS. 1, 2, 6, 7 and 8 is especially well-suited for use in skimming the surface of small bodies of liquid, such as fish tanks, small ponds, swimming pools and the like. In this form of the invention, the skimmer is required to operate at one basic position with respect to the surface of the surrounding body of liquid, and the flotation means in the outer body and beneath the movable weir 30 are constructed to provide fixed buoyancies. After the initial setting no further adjusting of the buoyancy of either flotation means is normally required.

As noted above, by far the greatest part of the dirt and debris that gets into a body of liquid is airborne in origin. It is caught and retained on the surface of the liquid by the existing surface tension. As a result, this dirt and debris can be effectively and efficiently removed by skimming off just the surface "skin" — just the surface tension layer or meniscus. By skimming this surface layer, the skimmer pulls in the dirtiest part of the liquid. Also, as part of the meniscus is pulled into the skimmer the rest of the surface film will follow. This effect is easily demonstrated, and in practice means that any and all film on the surface of the body of liquid is rapidly removed by the skimmer of the present invention.

The efficiency of the skimming action is therefore dependent upon creating the proper cascade effect over the back edge of the weir 30. If the weir 30 rides too low within the body 22 and surface S, too much liquid will pass over the edge of the weir 30. The proper acceleration of the inflowing liquid within the opening 26 and most efficient pulling or skimming of the surface tension or meniscus layer by the waterfall or cascade C will not be obtained. If the back edge of the weir 30 is positioned too high, with respect to the body 22 and the surface S, the skimmer will either operate in an intermittent or inefficient manner, or may not operate at all.

The proper operation of the skimmer 20 is therefore dependent upon a proper relationship between buoyancies of the flotation compartment 36 in the outer body and the buoyancy provided by the float 34 beneath the weir 30, and this will become more apparent from the description of operation described in greater detail below.

A flexible hose 42 is connected to a boss 44 surrounding the drain opening 28, and a suction pump and debris collector (not illustrated) are connected to the other end of the flexible hose 42.

As best illustrated in FIG. 1, an inlet screen 46 is positioned across the inlet 26. It includes a number of spaced tines 48 which serve to screen out ornamental fish large floating debris such as sticks, clumps of moss, and the like, and which could clog the action of the skimmer 20. This inlet screen is preferably connected to the outer body 22 by a hinge connection (not illustrated) along the upper edge of the screen 46.

Figure 2:
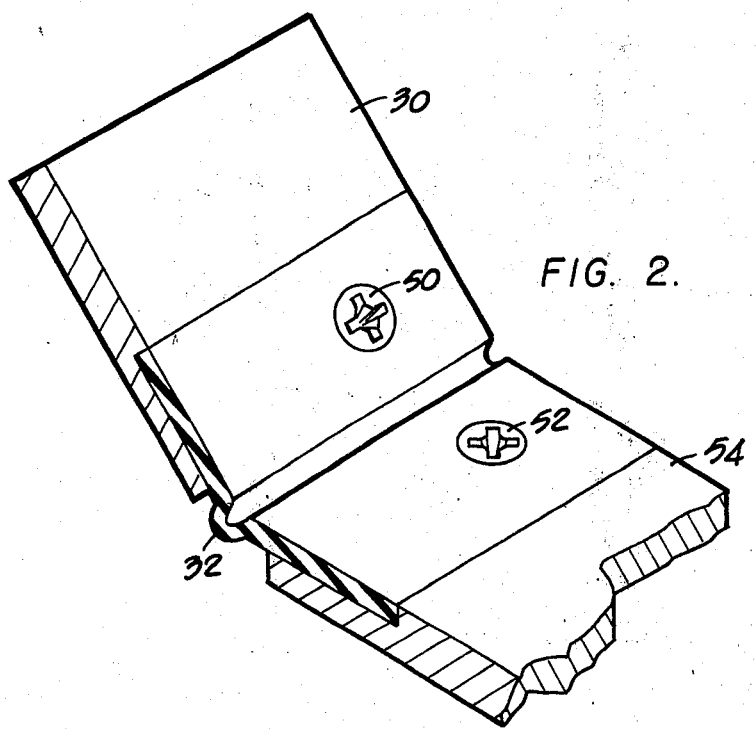
FIG. 2 is an enlarged isometric view of a part of a flexible hinge for a floating weir used in the skimmer shown in FIG. 1.

FIG. 2 shows details of one form of the hinge connection 32 for the weir. As illustrated in FIG. 2, the hinge 32 is a flexible plastic part, in this case nylon, and is attached to the forward, outer edge of the weir 30 by a series of screws 50. It is also connected by screws 52 to the back edge of an inwardly-extending shelf 54. The shelf provided by the fixed wall 54 forms the lower surface of the opening 26. Other suitable connectors can, of course, be used.

Further details of construction of the floating skimmer 20 are illustrated in FIG. 8, which is an exploded view. In FIG. 8 the weir 30 and the shelf 54 have been omitted for clarity of illustration.

As illustrated in FIG. 8, the outerbody 22 comprises a main shell having an outer periphery which is substantially circular in plan view. This configuration produces a stabilizing and self-centering action in an agitated body of liquid.

The inlet opening 26 is defined by the inner side wall 56 and a back wall 58 formed integrally in the body shell.

The forward end of the inner cavity 24 is defined by a front wall 60.

As best illustrated in FIG. 7, the inner cavity 24 defined by the inner side wall 56, the back wall 58 and the front wall 60 is slightly offset from the central, vertical axis of the skimmer. The weight distribution of the liquid within the cavity 24 is more toward the opening 26 to insure that this opening 26 stays down with the body of the liquid L and below the surface S.

The bottom wall of the cavity 26, and the bottom wall of the annularly-extending compartment 36, is defined by a base plate 62.

The hose 42 is retained on the downwardly-extending boss 44 by a snap ring 64.

The partition 38 is preferably formed with arched areas 66 which provide upper pockets for connecting pressurized air conduits to the topmost parts of the ballast chambers 36a lying directly below these three raised portions, but this is a feature which has utility primarily with the embodiment of the invention illustrated in FIG. 3–5, as will be described in greater detail below.

The top cap piece 68 seals off the air chambers 36b. The convex curvature of this top cap piece contributes to the stability of the skimmer, because it presents a minimum of obstruction to any waves or wind action in this part of the skimmer.

As illustrated in FIG. 8, the main component parts of the skimmer 20 comprise a relatively simple construction. These component parts are readily molded of plastic for the form of the invention used in fish tanks, ponds, swimming pools, and the like, where the ballast can be fixed.

The buoyancy chambers 36b in the outer body and 35 beneath the weir 30 may be filled with or constructed with a suitable flotation material, such as plastic foam, rather than with air.

Because the chamber 36 wraps around the inside of the body 22 on three sides, the liquid ballast gives the floating skimmer a uniform flotation when effluents are being pumped through the drain opening 28.

The inner upward angle at which the weir 30 is inclined in normal operation produces an acceleration of the liquid as it flows into the inlet opening 26 and over the weir 30.

The size of the articulated weir and the size and placement of the horizontal fixed wall 54 to which the articulated weir 30 is connected are such that they will allow a full flow of liquid without cutting off the flow of liquid.

The skimmer 20 thus far described thus provides a basic balance in which the material of construction is of substantially neutral buoyancy. The float chamber 35 provides enough buoyancy under the weir so that the weir 30 at rest (without pump action) allows the back edge of the weir to meet the external liquid level. This is the "at rest" position illustrated in FIG. 6.

When the pump is turned on to draw liquid out of the cavity 24 through the drain opening 28, the weir 30, which is normally substantially vertical in the FIG. 6 "at rest" position holds back the flow of liquid into the cavity behind the weir to a sufficient extent to permit the pump and hose to partially evacuate this inner cavity 24 and to thereby create an air chamber 31 behind the weir. This partial evacuation in itself thus tends to cause a positive buoyancy and tends to cause the entire unit to come up out of the liquid. Operating against the positive buoyancy, there is the ring of liquid in the compartment 36. This ring of liquid is (by the prior action of partial evacuation) raised above the level of the outside liquid. This tends to cause a negative buoyancy, which tends to cause the skimmer 20 to find equilibrium. The positioning of the weir 30 and the back liquid jacket 36a causes the air pocket 31 to be developed behind the general center of flotation. However, the positive buoyancy which the air pocket 31 creates is compensated for by the mass of liquid in the chamber 36a which lies to the rear of the skimmer 20. In the meantime, liquid is drawn in (past the strainer 46) and into the inlet opening 26. The incoming liquid flows over the weir 30 (which is at this point disposed at an angle between the horizontal and vertical as illustrated in FIG. 7) and cascades off the inner lip of the weir and down into the internal cavity 24 with a waterfall effect. As noted above, the incoming liquid is accelerated as it goes up over the inner, back edge of the weir 30, and the cascade action gives the skimming action to pull the meniscus off the liquid in the body of liquid surrounding the skimmer 20.

In the course of operation, the body of liquid surrounding the skimmer 20 can become agitated as a result of a number of factors. These include waves, people splashing the water in a swimming pool, etc. The skimmer 20, because of the annular ballast chamber 36, tends to stabilize itself so that there is the desired cascading. The skimming effect is maintained, with the weir providing an almost self-centering action to maintain this desired skimming, even though the outside water is agitated. The construction of the skimmer 20 therefore creates the desired meniscus-pulling effect under agitated conditions, as well as under ideal conditions. Even when rocked by waves, the lower edge 54 of the inlet opening 26 does not tend to dig too deeply into the liquid, while the upper edge of the weir 30 is also prevented from pulling out of the water. The action of the skimmer 20 can be manually adjusted prior to installation, so that the manufacturer can "tune" the device to maximize its potential as a meniscus-remover. In the embodiment of the invention illustrated in FIGS. 1, 2, 6, 7 and 8, this "tuning" is achieved by initial selection of the amount of ballast liquid and air in the annular flotation compartment 36 of the outer body and the size of the flotation compartment 35 beneath the annular weir 30.

FIGS. 3–5 show another embodiment of the present invention in which the skimmer incorporates controls for regulating the buoyancy of both the skimmer body and the floating weir.

In the FIG. 3 embodiment, the skimmer is indicated generally by the reference numeral 80, and the parts of the skimmer 80 which are like the parts of the skimmer 20 of the FIG. 1 embodiment are indicated by like reference numerals.

The skimmer shown in FIG. 3 is particularly adapted for operation in large bodies of open water, such as oceans, and incorporates controls for regulating the buoyancy of both the outer body 22 and the floating weir 30. As will be described in more detail below, the skimmer 80 permits independent control of the flotation of each separate chamber 36a in the annular liquid ballast jacket as well as independent control of the flotation of the chamber 35 beneath the weir 30. These control mechanisms effect the balance and flotation of both the outer body 22 and the weir. Consequently, the general flotation characteristics, and more importantly the skimming characteristics of the weir may be controlled by an operator and at a location remote from the skimmer.

The control mechanism includes a source of pressurized gas, illustrated as a bottle 82 of compressed air in FIG. 3, a control valve assembly 84, and conduits 86, 88 and 90 connecting the outlet of the control valve assembly 84 with the two side and back chambers 36a in the outer body 22 and a conduit 100 connected to the chamber 35 below the weir 30.

The compressed air tank 82 has the usual control valves 102 and 104 for turning on and shutting off the flow out of the air bottle and for regulating the rate of flow through a line 106 to the inlet of the control valve assembly 84. The control valve assembly 84 includes a manifold 108 which connects the inlet line 106 to each one of four individual control valve elements in the assembly 84. The control valve assembly 84 also has four individual outlets 116 for bleeding air from the respective conduits 88, 100, 90 and 86.

An individual control valve element 118 is shown in FIG. 3 and is operated by a control handle 120. The control valve element incorporates intersecting passageways 122 and 124 which can be positioned either to connect conduit 86 to the pressurized air in line 106 or to bleed pressure from the conduit 86 to atmosphere through the outlet 116. Similarly, individual control handles 126, 128 and 130 permit individual control of the pressure within the respective conduits 90, 100 and 88.

As illustrated in FIG. 3, the conduits for the chambers 36a are connected beneath the raised parts 66, so that these conduits connect to the highest part of the liquid ballast chamber.

As illustrated in FIG. 5, the conduit 100 is connected to the chamber 35 by a flexible connector 132. This permits free articulation of the weir 30 about the pivot pin 32 without restraint. The lower end of the flexible connector 132 is connected to an L-shaped tube 134 which has an upper end extending closely adjacent the back edge of the weir 30 so that the inlet of air to this chamber 35 through the conduit 100 will always be at the uppermost part of the flotation chamber 35.

As also illustrated in FIG. 5, the lower part of the wall 34 has a series of spaced openings 136 which permit the free flow of liquid into and out of the lower part of the chamber 35 and to and from the body of liquid within the central cavity 24 on which the flotation member 34 floats. As pressurized air is admitted into the chamber 35, liquid is forced out of the openings 136 to increase the buoyancy of the weir float (to raise the weir); and as pressure is bled from the chamber 35 through the conduit 100 (by manual positioning of the control handle 120) more water flows into the chamber 35 to decrease the buoyance (to lower the weir).

Each of the chambers 36a has a series of openings 138 formed in the part of the base plate 62 which extends along the bottom of that chamber. These openings 138 permit the free flow of liquid into and out of the bottom of the liquid ballast chamber in response to regulation of the pressure within the top part of these ballast chambers by manual positioning of the control handles 126, 128 and 130.

by changing the pressure in one or both of the side chambers 36a the outer body 22 can be tilted from side-to-side, and by changing the pressure in the back chamber 36a the outer body 22 can be tilted front-to-back. By changing the pressures in all of the chambers 36a simultaneously, the outer body 22 can by raised or lowered within the surrounding body of liquid.

The skimmer 80 shown in FIG. 3 therefore permits individual variation of the flotation of each of the chambers 36a in the outer body 22 and individual variation of the pressure in the chamber 35 beneath the weir 30. The operator can readily compensate for factors such as viscosity of the liquid being skimmed, the amount of effluent leaving the sump or drain opening 28, changing conditions of operation when they occur during the course of a skimming operation, and different characteristics of skimming depending upon the types of liquid being skimmed and the general conditions in which the liquid is found.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A floating skimmer for skimming the surface of a body of liquid surrounding the skimmer while providing a self-compensating positioning of a weir for maintaining efficient skimming flow over the weir during varying conditions of operation, said skimmer comprising, an outer body having an inner, generally centrally disposed cavity, first flotation means in the outer body for regulating the level of flotation of the skimmer at rest before start-up of skimming operation, an opening in one peripheral part of the outer body for admitting a flow of liquid into the central cavity, drain means associated with the central cavity for draining liquid from the cavity and for conducting the drained liquid effluent away from the cavity during skimming operation, a movable weir extending across the width of said opening for regulating the quantity and velocity of liquid flow through the opening and into the central cavity, weir-positioning means for adjusting the height of the weir with respect to the surface of the body of liquid surrounding the skimmer to cause a cascade of liquid in a waterfall off the upper edge of the weir and a skimming of the surface of the liquid by the cascade action, said weir-positioning means including second flotation means on the underside of the weir for supporting the weir above the level of the liquid in the cavity during skimming operation, said second flotation means having sufficient excess buoyancy to keep an upper portion of the flotation means and the weir always high enough above the level of the liquid in the central cavity to prevent collapse of the weir and to insure dynamic weir action and a waterfall off the upper edge of the weir during operation of the skimmer, said outer body having inner wall means which coact with the weir and second flotation means during skimming operation to form an air-filled chamber behind the weir within the cavity and below the surface level of the surrounding liquid body and which air chamber provides a positive buoyancy acting in a direction to lift the outer body upwardly, said inner wall means also coacting with the outer body to form a ballast chamber having a rear chamber in back of the air-filled chamber, as viewed in the direction of fluid flow through said opening and over the weir, and two side chambers extending along the two sides of the air-filled chamber, said weir-positioning means including ballast in the ballast chamber, a portion of which ballast is raised above the surface level of the surrounding liquid body by the positive buoyance of said air chamber, the amount and location of the raised ballast being so located with respect to the air chamber as to provide a negative buoyancy vertically balancing the positive buoyancy of the air chamber, and wherein the rear chamber contains an amount of ballast behind the air chamber sufficient to counter balance the amount of liquid within the skimmer in front of the weir and above the level of the liquid in the air chamber to maintain front-to-back equilibrium and to prevent front-to-back tilting of the skimmer, whereby the amount and location of the ballast coacts with the second flotation means to provide a self-compensating position of the weir for maintaining efficient skimming flow over the weir during varying conditions of operation of the skimmer, such as variations in the amount of effluent leaving the drain means and agitation of the surface of the surrounding liquid body.

2. The invention defined in claim 1 including articulation means connecting the outer, front edge of the weir to said body for swinging movement about a generally horizontally-extending axis.

3. The invention defined claim 1 wherein the outer body has three inner side walls defining three sides of the cavity.

4. The invention defined in claim 1 wherein the outer body has a circular periphery which provides a stabilizing and self-centering action in an agitated body of liquid.

5. The invention defined in claim 2 wherein the ballast chamber is filled with a liquid ballast of substantially the same density as the density of the surrounding liquid body, to thereby provide neutral buoyancy of the ballast located below the surface level of the surrounding liquid body and the depth of the liquid ballast within the chamber and below the surface level of the surrounding liquid body is sufficiently great to provide enough mass to cause the floating skimmer to ride low within the surrounding body of liquid to provide stability and to resist tilting by waves impinging on the floating skimmer.

6. The invention defined in claim 5 wherein the outer body has an upper surface which is arched in a convex configuration to minimize the effects of wind and waves on the stability of the skimmer.

7. The invention defined in claim 1 wherein the outer body has a generally circular peripheral configuration and the first flotation means include a generally annular compartment extending around the periphery of the outer body from one edge of said opening to an opposite edge of said opening.

8. The invention defined in claim 7 wherein the compartment is partially filled with liquid ballast.

9. The invention defined in claim 8 including an air chamber disposed above said compartment.

10. The invention defined in claim 8 including vertically-extending divider plates for subdividing said compartment into a plurality of separate chambers.

11. The invention defined in claim 1 including strainer means for preventing entry of debris into said opening.

12. The invention defined in claim 1 wherein said second flotation means comprise an enclosed chamber having a lower wall on the underside of the weir, and including pressurizing means for supplying pressurized gas to an upper part of said weir float chamber, an opening extending through said lower wall for permitting the flow of liquid into and out of the weir float chamber, and control means for regulating the pressure of the gas in an upper part of the weir float chamber to thereby control the level of the liquid in the lower part of the weir float chamber and therefore the flotation level of the weir.

13. The invention defined in claim 12 wherein said pressurizing means include an inlet tube having an outlet end positioned near the upper edge of the weir.

14. The invention defined in claim 9 including an opening extending through a bottom wall of the outer body for connecting the lower part of said compartment with the body of liquid to permit the flow of liquid into and out of the lower part of said compartment, pressurizing means for supplying pressurized gas to an upper part of said compartment to vary the level of liquid in said compartment, and control means for regulating the pressure of the gas in the upper part of said compartment to thereby control the level of the liquid in the lower part of said compartment and therefore the flotation level of said floating skimmer.

15. The invention defined in claim 14 including vertically-extending divider plates for subdividing said compartment into a plurality of separate chambers, and wherein each separate chamber has an opening extending through its bottom wall, and wherein the pressurizing means supply pressurized gas to an upper part of each separate compartment.

16. The invention defined in claim 14 wherein the pressurizing means include a source of pressurized gas and conduits connecting the source of pressurized gas to said compartment, and wherein said control means are associated with said conduits at a position remote from said body so that the flotation level of the skimmer can be controlled from a remote location.

17. The invention defined in claim 16 wherein said outer body includes a plurality of generally vertically-extending divider members which divide said compartment into separate chambers, said conduits include an individual conduit connected to each separate chamber and the control means include a separate control valve for each conduit whereby the altitude and the attitude of the floating skimmer with respect to the surrounding body of water can be controlled by the control means.

18. The invention defined in claim 17, wherein the weir-positioning means include an enclosed weir float chamber on the underside of the weir, the pressurizing means include a weir control conduit extending from the source of pressurized gas to said weir float chamber, and the control means include an opening extending through a lower wall of the weir float chamber for permitting the flow of liquid into and out of the weir float chamber, and the control means include a separate valve in the weir control conduit, so that the flotation level of the weir can be adjusted independently of the first flotation means and whereby the pressure level in each separate chamber of the first flotation means can also be adjusted independently of each of the other separate chambers to regulate the attitude of the outer body side-to-side and front-to-back.

19. The invention defined in claim 10 including openings extending through a bottom wall of the outer body for connecting the lower part of each of said separate chambers with the body of liquid to permit the flow of liquid into and out of the lower part of each of said separate chambers, pressurizing means for supplying a pressurized gas to an upper part of each of said separate chambers to vary the level of liquid in each of said separate chambers, and control means for separately regulating the pressure of the gas in the upper part of each of said separate chambers to thereby vary both the flotation level and the attitude of said floating skimmer.

20. A method for cleaning the surface of a body of liquid around a floating skimmer of the kind having an outer body and an inner cavity within the outer body, said method comprising;

conducting liquid from outside the body into the inner cavity through a side opening in the body, pumping liquid out of the cavity through a bottom opening during skimming operation, accelerating the incoming liquid over a movable weir positioned between the side opening and the central cavity producing a cascade of liquid in a waterfall behind the weir for pulling and skimming the surface of the inflowing liquid at the back, inner edge of the weir, creating in the central cavity during the pumping of liquid out of the cavity an air chamber which is located behind the weir and below the surface level of the surrounding liquid body and which provides a positive buoyancy acting in a vertical direction to lift the outer body and the weir upwardly, regulating the height of the weir with respect to the surface of the body of liquid outside the skimmer body by supporting the weir on the liquid in the cavity at a level above the surface of the liquid in the cavity by weir flotation means positioned beneath the weir and having sufficient excess buoyancy to keep an upper portion of the flotation means and the weir always high enough above the level of the liquid in the central cavity to prevent collapsing of the weir and to insure dynamic weir action and by vertically balancing the positive buoyancy of the air chamber with a negative buoyancy of ballast raised above the surface level of the surrounding liquid body by said positive buoyancy of the air chamber, maintaining front-to-back equilibrium and preventing front-to-back tilting of the skimmer by locating ballast behind the air chamber in an amount sufficient to counterbalance the amount of liquid within the skimmer and above the level of the liquid in the air chamber, and thereby coordinating the amount and location of the ballast with the buoyancy of the weir flotation means to provide a self-compensating positioning of the weir for maintaining efficient skimming flow over the weir during varying conditions of operation of the skimmer, such as variations in the amount of effluent pumped out of the bottom opening and agitation of the surface of the surrounding liquid body.

* * * * *